United States Patent
Harada et al.

(10) Patent No.: US 7,118,184 B2
(45) Date of Patent: Oct. 10, 2006

(54) ROLL-OVER SUPPRESSING CONTROL APPARATUS FOR A VEHICLE

(75) Inventors: Masaharu Harada, Tokyo (JP); Kunio Sakata, Tokyo (JP)

(73) Assignee: Mitsubishi Fuso Truck and Bus Corporation, (JP)

( * ) Notice: Subject to any disclaimer, the term of this patent is extended or adjusted under 35 U.S.C. 154(b) by 0 days.

(21) Appl. No.: 10/953,484

(22) Filed: Sep. 29, 2004

(65) Prior Publication Data
US 2005/0099065 A1 May 12, 2005

(30) Foreign Application Priority Data
Sep. 30, 2003 (JP) .............................. 2003-341500

(51) Int. Cl.
*B60T 8/60* (2006.01)
(52) U.S. Cl. ...................... 303/146; 303/140; 180/282
(58) Field of Classification Search ................ 303/191, 303/146, 140, 192, 139; 180/282, 283, 284, 180/285
See application file for complete search history.

(56) References Cited

U.S. PATENT DOCUMENTS

| | | | | |
|---|---|---|---|---|
| 5,134,352 | A * | 7/1992 | Matsumoto et al. | 318/587 |
| 5,683,152 | A * | 11/1997 | Hu | 303/146 |
| 5,747,683 | A * | 5/1998 | Gerum et al. | 73/118.1 |
| 5,964,819 | A | 10/1999 | Naito | |
| 6,074,020 | A | 6/2000 | Takahashi et al. | |
| 6,086,168 | A * | 7/2000 | Rump | 303/191 |
| 6,176,555 | B1 * | 1/2001 | Semsey | 303/7 |
| 6,360,147 | B1 | 3/2002 | Lee | |
| 6,378,957 | B1 * | 4/2002 | Vångstedt | 303/9.62 |
| 6,431,663 | B1 * | 8/2002 | Fennel et al. | 303/147 |
| 6,554,293 | B1 | 4/2003 | Fennel et al. | |
| 6,600,985 | B1 * | 7/2003 | Weaver et al. | 701/45 |
| 6,668,225 | B1 * | 12/2003 | Oh et al. | 701/70 |
| 6,708,088 | B1 | 3/2004 | Matsuno et al. | |
| 6,719,088 | B1 | 4/2004 | Nakano et al. | |
| 6,834,218 | B1 * | 12/2004 | Meyers et al. | 701/1 |

(Continued)

FOREIGN PATENT DOCUMENTS

DE 100 39 108 A1 7/2001

(Continued)

OTHER PUBLICATIONS

Relevant portion of German Office Action of corresponding German Application 10 2004 046 987.3-21.

(Continued)

*Primary Examiner*—Robert A. Siconolfi
(74) *Attorney, Agent, or Firm*—Rossi, Kimms & McDowell, LLP

(57) ABSTRACT

The invention provides a roll-over suppressing control apparatus for a vehicle which can make a decision of a start of roll suppressing control appropriately in response to the degree of the possibility of turning over on its side of the vehicle. The roll-over suppressing control apparatus includes a braking mechanism for braking wheels of the vehicle, a roll rate sensor for detecting a roll rate of the vehicle, and a roll-over suppressing control section for controlling the braking mechanism so that, if the roll rate detected upon turning of the vehicle becomes equal to or higher than a control starting threshold value, then it is decided that the vehicle is in an excessively rolling state and braking force is applied to the wheels. The control starting threshold value is set to different values depending upon different types of turning of the vehicle (depending upon whether the turning is sudden steering back turning, moderate steering back turning or one-directional turning).

11 Claims, 8 Drawing Sheets

U.S. PATENT DOCUMENTS

| | | |
|---|---|---|
| 6,865,469 B1 | 3/2005 | Batistic et al. |
| 6,904,350 B1* | 6/2005 | Lu et al. ........................ 701/70 |
| 2001/0037677 A1* | 11/2001 | Holst et al. ................... 73/121 |
| 2003/0100979 A1 | 5/2003 | Lu et al. |
| 2003/0204293 A1 | 10/2003 | Shiino et al. |
| 2004/0117085 A1 | 6/2004 | Lu et al. |
| 2004/0216020 A1 | 10/2004 | Stiller |
| 2004/0254703 A1 | 12/2004 | Traechtler et al. |
| 2005/0049773 A1 | 3/2005 | Kitapini et al. |
| 2005/0251316 A1 | 11/2005 | Kato et al. |
| 2006/0064213 A1 | 3/2006 | Lu et al. |

FOREIGN PATENT DOCUMENTS

| | | |
|---|---|---|
| DE | 101 35 020 A1 | 2/2003 |
| DE | 102 54 211 A1 | 9/2003 |
| DE | 103 18 111 A1 | 11/2004 |
| DE | 103 31 726 A1 | 2/2005 |
| JP | 10-81215 A | 3/1998 |
| JP | 11-11272 A | 1/1999 |
| JP | 2000-168526 A | 6/2000 |
| JP | 2000-344075 A | 12/2000 |
| JP | 2000-346869 A | 12/2000 |
| JP | 2001-105927 A | 4/2001 |
| JP | 2001-354128 A | 12/2001 |
| JP | 3257354 B2 | 12/2001 |
| JP | 2002-166826 A | 6/2002 |
| JP | 2002-168620 A | 6/2002 |

OTHER PUBLICATIONS

Relevant portion of German Office Action of related German Application 10 2004 047 394.3-21.

* cited by examiner

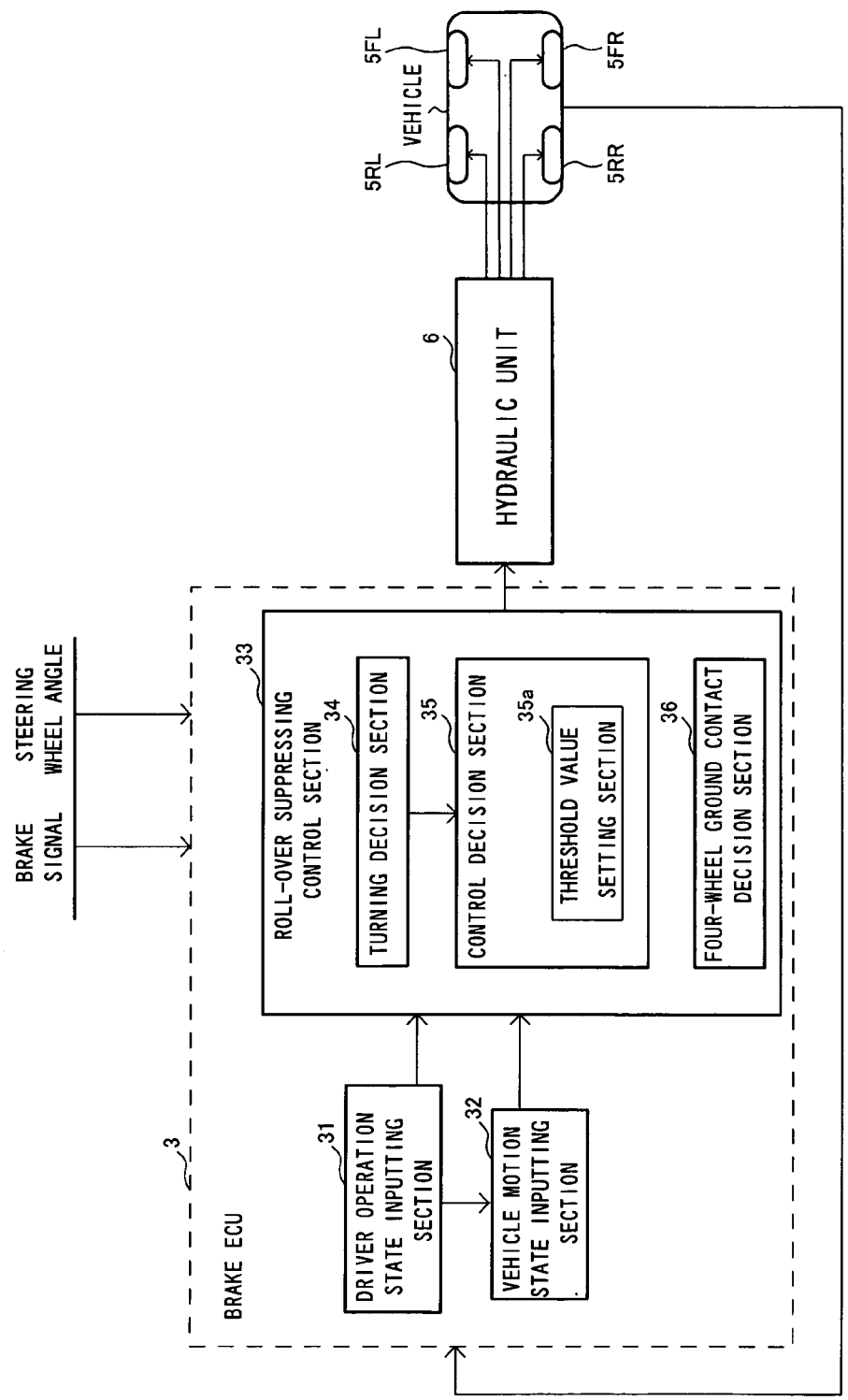

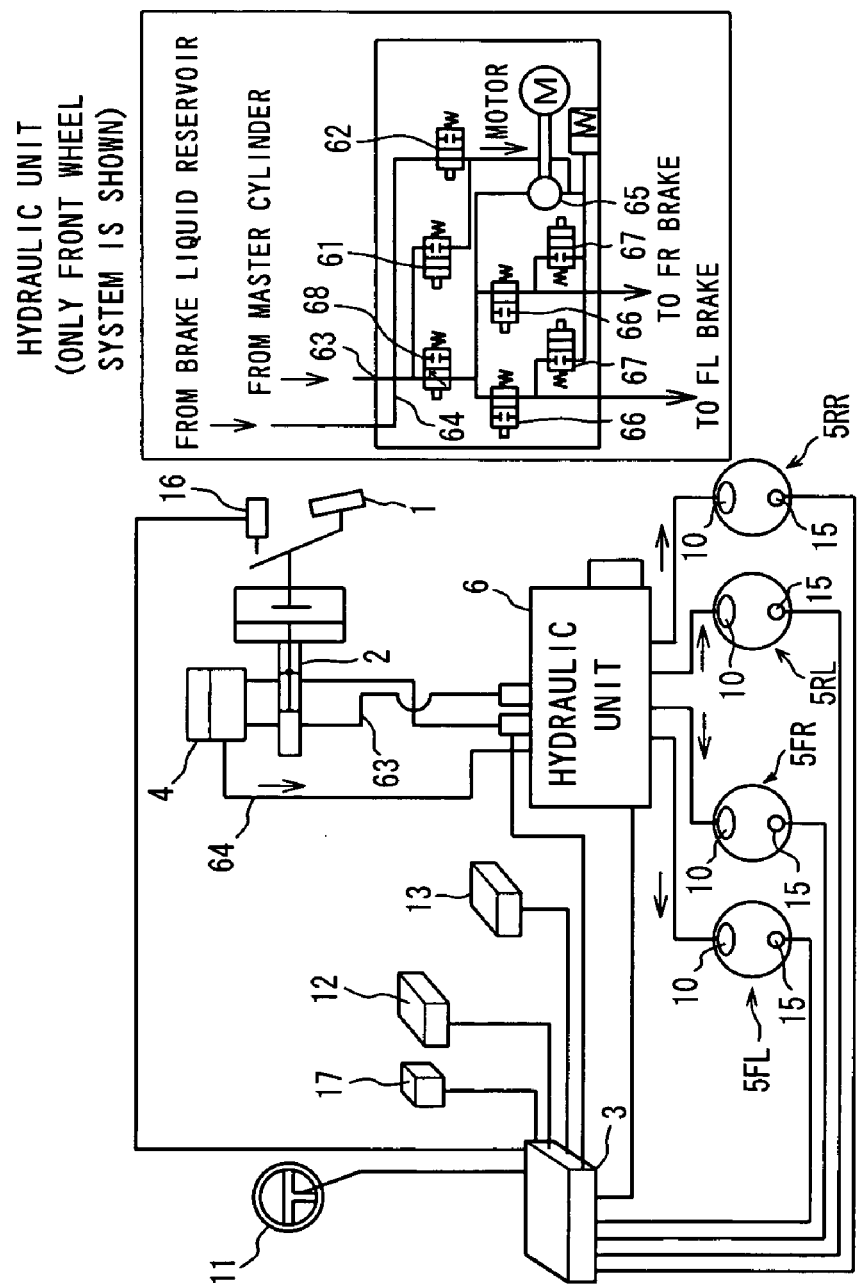

UPON LEFTWARD TURNING

UPON RIGHTWARD TURNING

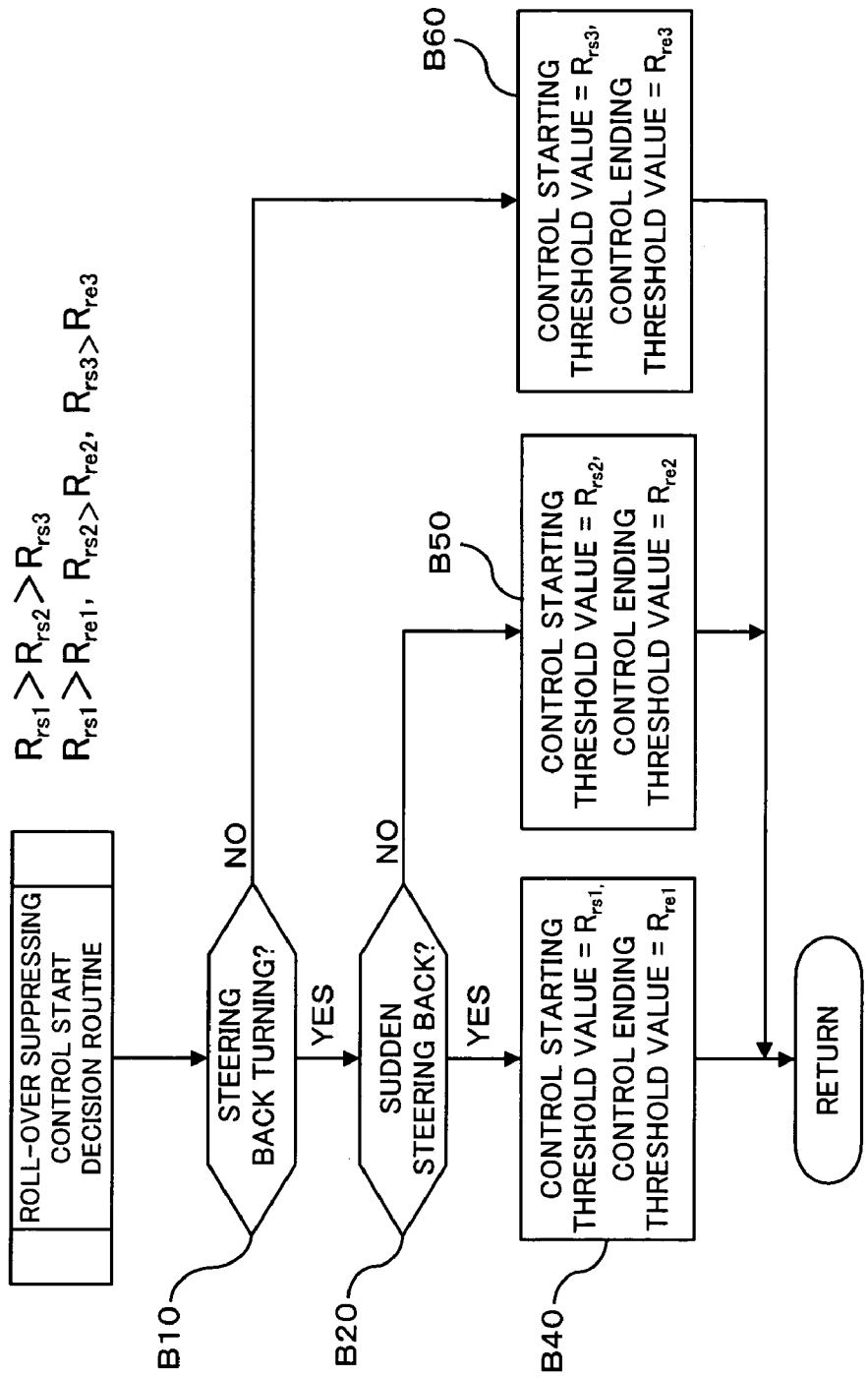

ROLL-OVER SUPPRESSING CONTROL APPARATUS FOR A VEHICLE

BACKGROUND OF THE INVENTION

1. Field of the Invention

This invention relates to a roll-over suppressing control apparatus for a vehicle which causes, when the vehicle is placed into an excessive rolling state upon turning thereof, braking force to be applied to wheels to carry out roll-over suppressing control.

2. Description of the Related Art

As a technique for controlling the posture of a vehicle upon turning, a technique has been developed wherein a rolling state of the vehicle body is detected and, when the rolling of the vehicle body is excessively great, braking force is applied to particular wheels to suppress rolling of the vehicle thereby to suppress roll-over (turning over on its side) of the vehicle (refer to, for example, Japanese Patent Laid-Open No. Hei 11-11272).

According to the technique, when a roll rate (rolling angular velocity of the vehicle body is detected and the detected roll rate is equal to or higher than a predetermined value or when a steering angular velocity is arithmetically operated based on a steering angle detected by a steering angle sensor and the arithmetically operated steering angular velocity is equal to or higher than a predetermined value, the brake system of the vehicle is controlled to suppress rolling of the vehicle body.

In order to suppress rolling of a vehicle, it is effective to lower the speed of the vehicle.

Incidentally, according to the technique wherein braking force is applied to suppress roll-over as described above, since the vehicle speed is lowered against the will of the speed of the driver in order to suppress roll-over, it is not desired to carry out the roll-over suppressing control unnecessarily. Therefore, it is important to set conditions for starting the roll-over suppressing control, and it is desired to carry out such control only when the possibility takes place that roll-over may occur.

While the prior art described above adopts such logic that roll suppressing control is started when the magnitude of the roll rate exceeds a predetermined value (a certain fixed value), it seems that this is based on an idea that the magnitude of the roll rate indicates the possibility of roll over (degree of turning over on its side) of the vehicle.

However, the relationship between the roll rate (or the value of some other parameter representative of a rolling state of the vehicle) and the degree of turning over on its side of the vehicle is not always fixed, but actually differs depending upon the turning situation. Therefore, where the roll suppressing control is started when the magnitude of the roll rate exceeds a fixed value as in the prior art, the roll suppressing control may sometimes be carried out unnecessarily depending upon the turning situation or, although it is necessary to start the roll suppressing control, the roll suppressing control may not sometimes be started.

SUMMARY OF THE INVENTION

It is an object of the present invention to provide a roll-over suppressing control apparatus for a vehicle which can make a decision of starting of roll suppressing control appropriately in response to the degree of the possibility of turning over on its side of the vehicle.

In order to attain the object described above, according to the present invention, there is provided a roll-over suppressing control apparatus for a vehicle, comprising a braking mechanism for braking wheels of the vehicle, parameter value detection means for detecting a value of a parameter corresponding to a rolling state of the vehicle, and roll-over suppressing control means for controlling the braking mechanism so that, if the parameter value detected by the parameter value detection means upon turning of the vehicle becomes equal to or higher than a control starting threshold value, then it is decided that the vehicle is in an excessively rolling state and braking force is applied to the wheels, the control starting threshold value being set to different values depending upon different types of turning of the vehicle.

With the roll-over suppressing control apparatus for a vehicle, since the control starting threshold value to be used to decide whether or not the vehicle is in an excessively rolling state and it should be decided to start roll-over suppressing control wherein braking force is applied to a turning outer wheel set to different values depending upon different types of turning of the vehicle, the roll-over suppression-control can be started appropriately depending upon the type of turning of the vehicle and starting of unnecessary roll-over suppressing control can be suppressed. Accordingly, roll-over of the vehicle can be suppressed while the traveling performance of the vehicle is assured.

Preferably, the parameter value is a roll rate of the vehicle, and the parameter value detection means is roll rate detection means for detecting the roll rate.

Preferably, if the roll rate detected by the roll rate detection means upon turning the vehicle is lower than a control ending threshold value set in advance as a value lower than the control starting threshold value, then the roll-over suppressing control means ends the control for applying the braking force to the wheels.

Preferably, the types of turning of the vehicle include one-directional turning wherein the vehicle turns only in one direction and steering back turning wherein the turning direction is changed over halfway.

Preferably, the control starting threshold value upon the steering back turning is set to a value higher than the control starting threshold value upon the one-directional turning.

Preferably, the steering back turning includes quick steering back turning wherein the steering back turning is performed quickly and normal steering back turning wherein the steering back turning is performed at a normal speed or less, and the control starting threshold value upon the quick steering back turning is set to a value higher than the control starting threshold value upon the normal steering back turning.

Preferably, discrimination between the quick steering back turning and the normal steering back turning is performed by comparing a magnitude of a steering angular velocity upon the steering back turning with a reference value set in advance, and if the magnitude of the steering angular velocity is equal to or higher than the reference value, then it is decided that the turning is the quick steering back turning, but if the magnitude of the steering angular velocity is lower than the reference value, then it is decided that the turning is the normal steering back turning.

Preferably, a condition that the vehicle is turning is set to satisfaction of all of conditions that a vehicle speed is higher than a predetermined vehicle speed set in advance, that the steering angular velocity is equal to or higher than a predetermined angular velocity set in advance, and that a lateral acceleration of the vehicle is equal to or higher than a predetermined acceleration set in advance.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 1 is a control block diagram of a roll-over suppressing control apparatus for a vehicle according to an embodiment of the present invention;

FIG. 2 is a system diagram of the roll-over suppressing control apparatus for a vehicle;

FIGS. 6, 7 and 8 are flow charts illustrating the roll-over suppressing control by the roll-over suppressing control apparatus for a vehicle.

DESCRIPTION OF THE PREFERRED EMBODIMENT

Figure 3A:
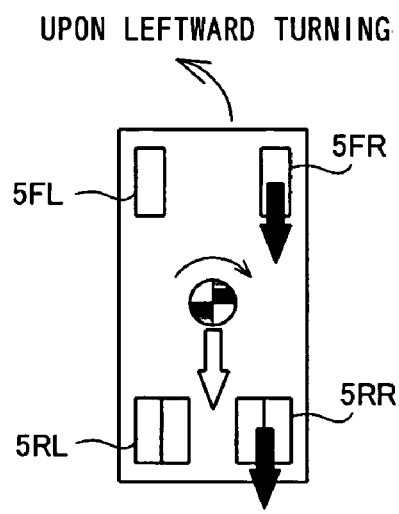
FIGS. 3(a) and 3(b) are schematic views illustrating rollover suppressing control by the roll-over suppressing control apparatus for a vehicle.

A roll-over suppressing control apparatus for a vehicle according to an embodiment of the present invention is equipped in such a braking system for a vehicle as shown in FIG. 2. Referring to FIG. 2, the braking system for a vehicle includes a brake pedal 1, a master cylinder 2 which operates in an interlocking relationship with an operation of the brake pedal 1, and a hydraulic unit 6 for controlling the brake fluid pressure to be supplied from the master cylinder 2 or a brake fluid reservoir 4 to wheel cylinders of wheel brakes (hereinafter referred to as brakes) 10 for braking wheels (front left and right wheels and rear left and right wheels) 5FL, 5FR, 5RL, 5RR in response to the state of the master cylinder 2 or an instruction from a braking controller (brake ECU) 3. It is to be noted here that a braking mechanism is formed from a liquid pressure adjusting system including the master cylinder 2, hydraulic unit 6 and so forth and the brakes 10 for the braking wheels and so forth.

In particular, as seen in FIG. 2 (in FIG. 2, only the left and right wheel brakes for the front wheels are shown), when the vehicle is in a behavior control mode, a differential pressure regulating valve 68 in the hydraulic unit 6 operates so that a predetermined pressure difference may appear between the upstream and the downstream of the differential pressure regulating valve 68. When the vehicle is in the behavior control mode and the brake pedal 1 is not operated, an in-line intake valve 61 is closed while an out-line intake valve 62 is opened. Consequently, the brake fluid in the brake fluid reservoir 4 is introduced through an out-line 64, the out-line intake valve 62 and a pump 65 and is pressurized by the pump 65, and the pressure of the brake liquid is adjusted by a liquid pressure holding valve 66 and a pressure reducing valve 67 and the brake liquid of the adjusted pressure is supplied to the brakes 10 for the wheels. When the vehicle is in the behavior control mode and the brake pedal 1 is operated, since the in-line intake valve 61 is opened and the out-line intake valve 62 is closed, the brake fluid in the master cylinder 2 is introduced through an in-line 63, the in-line intake valve 61 and the pump 65 and pressurized by the pump 65. Then, the pressure of the brake fluid is adjusted by the liquid pressure holding valve 66 and the pressure reducing valve 67, and the brake fluid of the adjusted pressure is supplied to the brakes 10 for the wheels. It is to be noted that the in-line 63 and the out-line 64 join together on the downstream of the in-line intake valve 61 and the out-line intake valve 62, and the pump 65 is disposed on the downstream of the joining location. The liquid pressure holding valve 66 and the pressure reducing valve 67 are provided for each of the braking wheels 5FL, 5FR, 5RL, 5RR on the downstream of the pump 65.

Upon normal braking, the in-line intake valve 61 and the out-line intake valve 62 are closed, and the differential pressure regulating valve 68 and the liquid pressure holding valve 66 are opened while the pressure reducing valve 67 is closed. Consequently, a brake fluid pressure corresponding to the pressure (that is, braking operation force) in the master cylinder 2 is supplied to the brake 10 for each of the wheels through the in-line 63, differential pressure regulating valve 68 and liquid pressure holding valve 66. On the other hand, when an ABS (antilock brake system or antiskid brake system) operates, a brake fluid pressure corresponding to the braking operation force is suitably adjusted through the liquid pressure holding valve 66 and the pressure reducing valve 67 so that each wheel may not be locked.

The in-line intake valve 61, out-line intake valve 62, pump 65, liquid pressure holding valves 66, pressure reducing valves 67 and differential pressure regulating valve 68 of the hydraulic unit 6 having such a configuration as described above are controlled by the brake ECU 3.

Various signals are inputted to the brake ECU 3. In particular, a steering wheel angle signal is inputted from a steering wheel angle sensor 11 provided for a steering wheel, and a yaw rate signal of the vehicle body is inputted from a yaw rate sensor 12 provided on the vehicle body. Further, a roll rate signal of the vehicle body is inputted from a roll rate sensor (roll state sensor corresponding to roll parameter value detection means for detecting a value of a parameter corresponding to a rolling state of the vehicle) 13 provided on the vehicle body, and a brake pedal operation signal is inputted from a brake switch 16. Furthermore, a forward-backward acceleration signal and a lateral acceleration signal are inputted from a forward-backward and lateral acceleration sensor 17 provided on the vehicle body, and vehicle speed (wheel speed) signals are inputted from wheel speed sensors 15.

The brake ECU 3 includes such various functional elements as seen in FIG. 1. Referring to FIG. 1, the brake ECU 3 includes a driver operation state decision section 31 for deciding an operation state of the driver, a vehicle motion state arithmetic operation section 32 for calculating a theoretical motion condition of the vehicle, and a roll-over suppressing control section 33.

The driver operation state decision section 31 decides whether or not the brake pedal 1 is operated from a brake pedal operation signal from the brake switch 16.

The vehicle motion state arithmetic operation section 32 calculates a vehicle body speed, a roll rate deviation and so forth based on detection values of the sensors. Although the vehicle body speed is normally calculated based on the wheel speed signals from the wheel speed sensors 15, if a slip occurs with a wheel, then the vehicle motion state arithmetic operation section 32 adds a time integrated value of a forward-backward acceleration obtained from the forward-backward and lateral acceleration sensor 17 to the vehicle body speed obtained till then based on the wheel speed signal to calculate the vehicle body speed (in this instance, the calculated vehicle body speed is an estimated vehicle body speed).

The roll-over suppressing control section 33 includes a turning decision section 34 for deciding a start and an end of turning of the vehicle, a control decision section 35 for deciding a start and an end of roll-over suppressing control, and a control amount setting section 36 for setting a control amount (roll-over suppressing control braking force) in response to the roll rate and so forth upon roll-over suppression control.

The roll-over suppressing control section 33 starts roll-over suppressing control if it is decided by the control decision section 35 that roll-over suppressing control should be started, and ends the roll-over suppressing control if it is decided by the control decision section 35 that the roll-over suppressing control should be ended. Upon such roll-over suppressing control, the roll-over suppressing control section 33 performs the control with a control amount set by the control amount setting section 36.

Figure 3B:
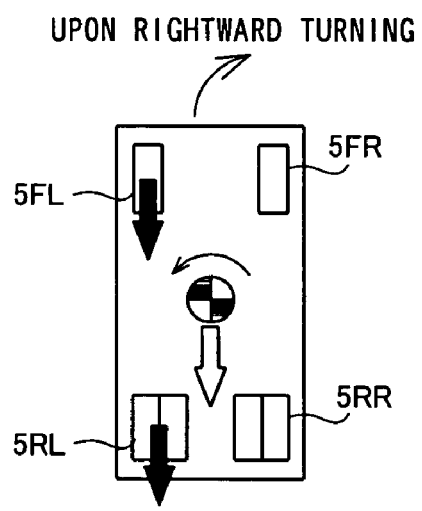

It is to be noted that, in the roll-over suppressing control, braking force is applied to the front and rear wheels which are turning outer wheels as seen in FIG. 3(a) or 3(b). The magnitude of the braking force applied at this instance is set as a value commensurate with the magnitude of the roll rate $R_r$ by the control amount setting section 36. It is to be noted that, while, in order to suppress rolling, it is effective to suppress the yaw rate of the vehicle and suppress the vehicle speed, braking force to the front wheel which is a turning outer wheel contributes much to suppression of the yaw rate of the vehicle while braking force to the rear wheel which is a turning outer wheel contributes much to suppression of the vehicle speed.

The turning decision section 34 decides that turning of the vehicle has been started if both of conditions (i) that the vehicle body speed $V_b$ is equal to or higher than a reference value (low speed value set in advance) $V_1$ and that (ii) the magnitude of the lateral acceleration $G_y$ of the vehicle body is equal to or higher than a reference value (fixed value set in advance) $G_{y1}$. Further, if any one of two conditions (iii) that the vehicle body speed $V_b$ is lower than a reference value (low speed value determined in advance) $V_2$ (where $V_2<V_1$) and (iv) that the magnitude of the lateral acceleration $G_y$ is lower than a reference value (predetermined acceleration set in advance) $G_{y2}$ (where $G_{y2}<G_{y1}$) is satisfied, then the turning decision section 34 decides that the vehicle has ended the turning.

The control decision section 35 performs roll-over suppressing control in response to the detected roll rate $R_r$ when a predetermined control start condition is satisfied. Here, the control start condition resides in satisfaction of a condition that it is decided by the turning decision section 34 that the vehicle is turning and another condition that the roll rate $R_r$ which is a value of a parameter corresponding to a rolling state of the vehicle is equal to or higher than a threshold value $R_{rs}$ set in advance.

Further, the control decision section 35 ends the roll-over suppressing control when a predetermined control end condition is satisfied during the roll-over suppressing control. Here, the control end condition resides in satisfaction of any one of a condition that it is decided by the turning decision section 34 that the vehicle is not turning and another condition that the roll rate $R_r$ is lower than the threshold value $R_{rs}$ set in advance.

Particularly, the control decision section 35 includes a control start/end threshold value setting section 35a which sets a threshold value $R_{re}$ for the roll rate $R_r$ to a value which differs depending upon the type of turning of the vehicle.

Figure 4A:
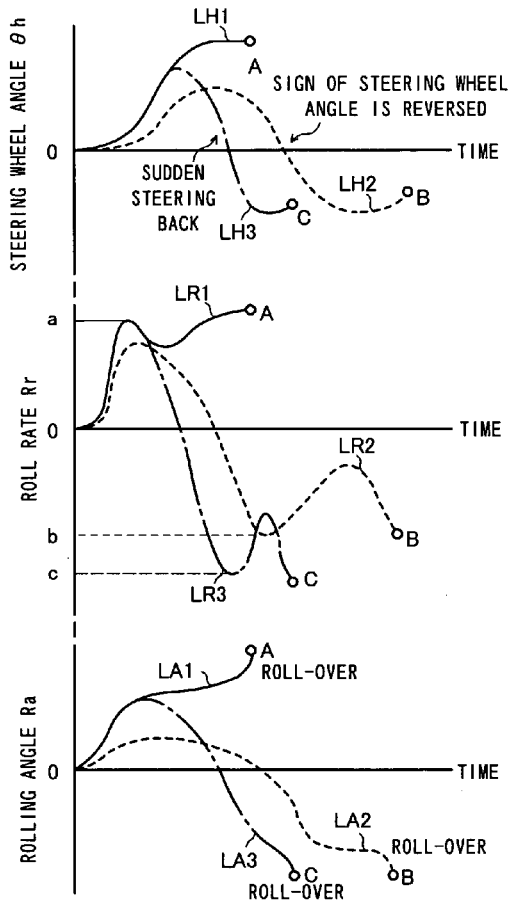
FIGS. 4(a), 4(b), 4(c) and 4(d) are diagrammatic views illustrating different control starting conditions by different types of turning by the roll-over suppressing control apparatus for a vehicle.
Figure 4C:
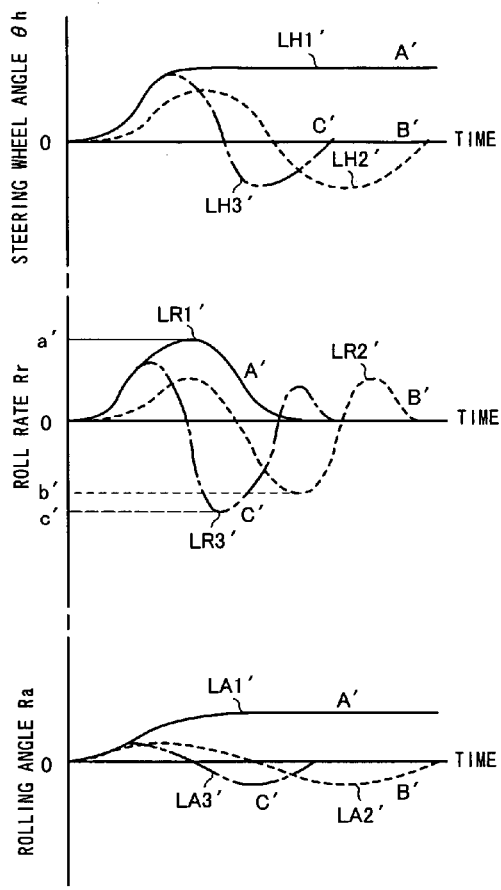
Figure 4B:
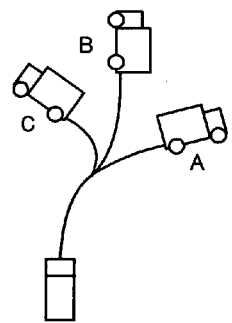
Figure 4D:
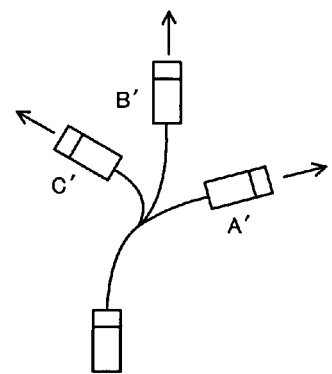

In particular, if the steering wheel operation and the vehicle speed operation are carried out appropriately, then the roll rate or the roll angle does not become excessive and does not cause turning over of the vehicle on its side as seen, for example, in FIG. 4(c) or 4(d). However, if the steering wheel operation and the vehicle speed operation are not carried out appropriately, then the roll rate or the roll angle becomes excessive and sometimes causes turning over of the vehicle on its side as seen, for example, in FIG. 4(a) or 4(b).

Figure 5:
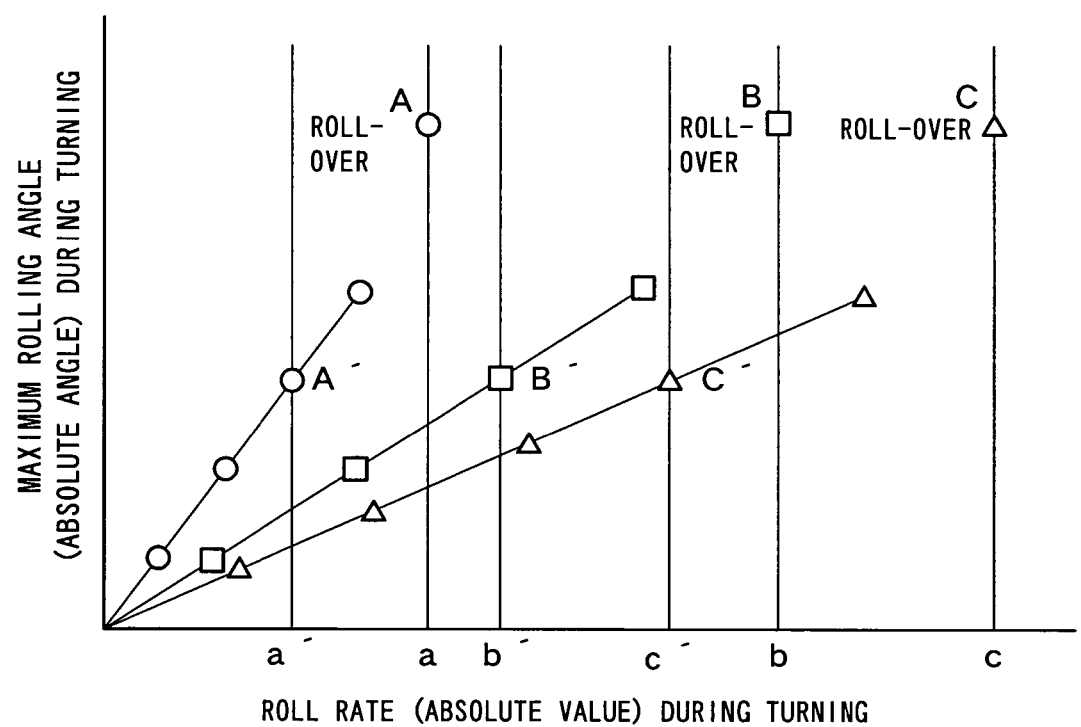
FIG. 5 is a diagram illustrating the different control starting conditions by different types of turning by the roll-over suppressing control apparatus for a vehicle.

For example, in ordinary turning (one-directional turning) which does not involve a steering back operation of the steering wheel, the steering wheel angle $θ_h$ increases in one direction as indicated by a solid line curve LH1 in FIG. 4(a). At this time, the roll rate $R_r$ increases suddenly to the turning outer side as the steering wheel angle $θ_h$ increases (that is, upon turning of the steering wheel) as indicated by another curve LR1. If the magnitude of the roll rate $R_r$ exceeds a limit, then the magnitude of the roll angle increases as indicated by a curve LA1 and may cause turning over of the vehicle on its side as indicated by a reference character A [refer to FIGS. 4(a), 4(b) and 5].

On the other hand, in steering back turning wherein turning back of the steering wheel is performed (for example, upon lane change or upon S-shaped curve traveling), the steering wheel angle $θ_h$ is directed in the reverse direction halfway as indicated by a curve LH2. At this time, the roll rate $R_r$ increases suddenly to the outer side of the steering back turning as the steering wheel angle $θ_h$ increases in the reverse direction (that is, upon starting of steering back turning) as indicated by a curve LA2 and sometimes causes turning over of the vehicle on its side as indicated by a reference character B [refer to FIGS. 4(a), 4(b) and 5]. In this steering back turning, the roll rate is likely to become high when compared with that in one-directional turning, and turning over of the vehicle on its side occurs after the roll rate becomes higher to some degree than that upon one-directional turning. Reversely speaking, it is considered that, in steering back turning, turning over of the vehicle on its side does not occur unless the roll rate becomes higher by a certain amount than that in one-directional turning.

Further, where steering back turning is performed suddenly as upon risk avoidance as indicated by an alternate long and short dash line in FIG. 4(a), the steering wheel angle $θ_h$ is directed in the reverse direction halfway as indicated by a curve LH3 similarly as described above. At this time, the roll rate $R_r$ increases suddenly by a great extent to the outer side of the steering back turning as the steering wheel angle $θ_h$ increases in the reverse direction (that is, turning back of the steering wheel) as indicated by a curve LR3. Also at this time, after the magnitude of the roll rate $R_r$ exceeds a limit, the magnitude of the rolling angle increases as indicated by a curve LA3 and sometimes causes turning over of the vehicle on its side as indicated by a reference character C [refer to FIGS. 4(a), 4(b) and 5]. In the case of such sudden steering back turning as upon risk avoidance, the roll rate is further likely to become high when compared with that in comparatively moderate normal steering back turning described hereinabove, and turning over of the vehicle on its side occurs after the roll rate becomes higher by a certain amount than that upon moderate steering back turning. Reversely speaking, it is considered that, in the case of sudden steering back turning, turning over of the vehicle on its side does not occur unless the roll rate becomes higher by a certain amount than that in the case of normal steering back turning.

In other words, it is considered that, where it is tried to start roll-over suppressing control paying attention to the roll rate, the optimum roll rate threshold value with which roll-over suppressing control should be started differs depending upon the type of turning of the vehicle such as upon whether the turning is one-directional turning or steering back turning or upon whether the steering back turning is sudden steering back turning as in the case of risk avoidance or comparatively moderate steering back turning as in the case of lane change or S-shaped curve traveling.

Therefore, in the present apparatus, the threshold value for the roll rate for decision of a start of roll-over suppression control is set to a value which differs depending upon the type of turning of the vehicle.

Whether the type of turning of the vehicle is one-directional turning or steering back turning can be decided depending upon whether or not a steering back operation is performed during turning decision, or more particularly, depending upon whether or not the steering wheel angular velocity $\omega_h$ in the steering back direction is equal to or higher than a comparatively low threshold value $\omega_{h2}$. Meanwhile, whether or not the steering back turning is sudden steering back turning can be decided depending upon the magnitude of the steering wheel angular velocity $\omega_h$ in the steering back direction, that is, depending upon whether or not the steering wheel angular velocity $\omega_h$ in the steering back direction is equal to or higher than a comparatively high threshold value $\omega_{h1}$.

The control start/end threshold value setting section 35a has control starting threshold values $R_{rs1}$, $R_{rs2}$, $R_{rs3}$ ($R_{rs1} > R_{rs2} > R_{rs3}$) of different magnitudes provided for the control starting threshold value $R_{rs}$ and further has control ending threshold values $R_{re1}$, $R_{re2}$, $R_{re3}$ ($R_{re1} > R_{re2} > R_{re3}$) provided for the control ending threshold value $R_{re}$ corresponding to different types of turning of the vehicle in advance. Then, the type of turning of the vehicle is decided in such a manner as described above, and a threshold value is set in accordance with the type of turning.

In particular, if the type of turning is sudden steering back turning, then the control starting threshold value and the control ending threshold value for the roll rate $R_r$ are set to comparatively high values of the control starting threshold value $R_{rs1}$ and the control ending threshold value $R_{re1}$ (where $R_{rs1} > R_{re1}$): if the type of turning is general (moderate) steering back turning, then the control starting threshold value and the control ending threshold value for the roll rate $R_r$ are set to medium values of the control starting threshold value $R_{rs2}$ and the control ending threshold value $R_{re2}$ (where $R_{rs2} > R_{re2}$): and if the type of turning is one-directional turning, then the control starting threshold value and the control ending threshold value for the roll rate $R_r$ are set to comparatively low values of the control starting threshold value $R_{rs3}$ and the control ending threshold value $R_{re3}$ (where $R_{rs3} > R_{re3}$).

Figure 6:
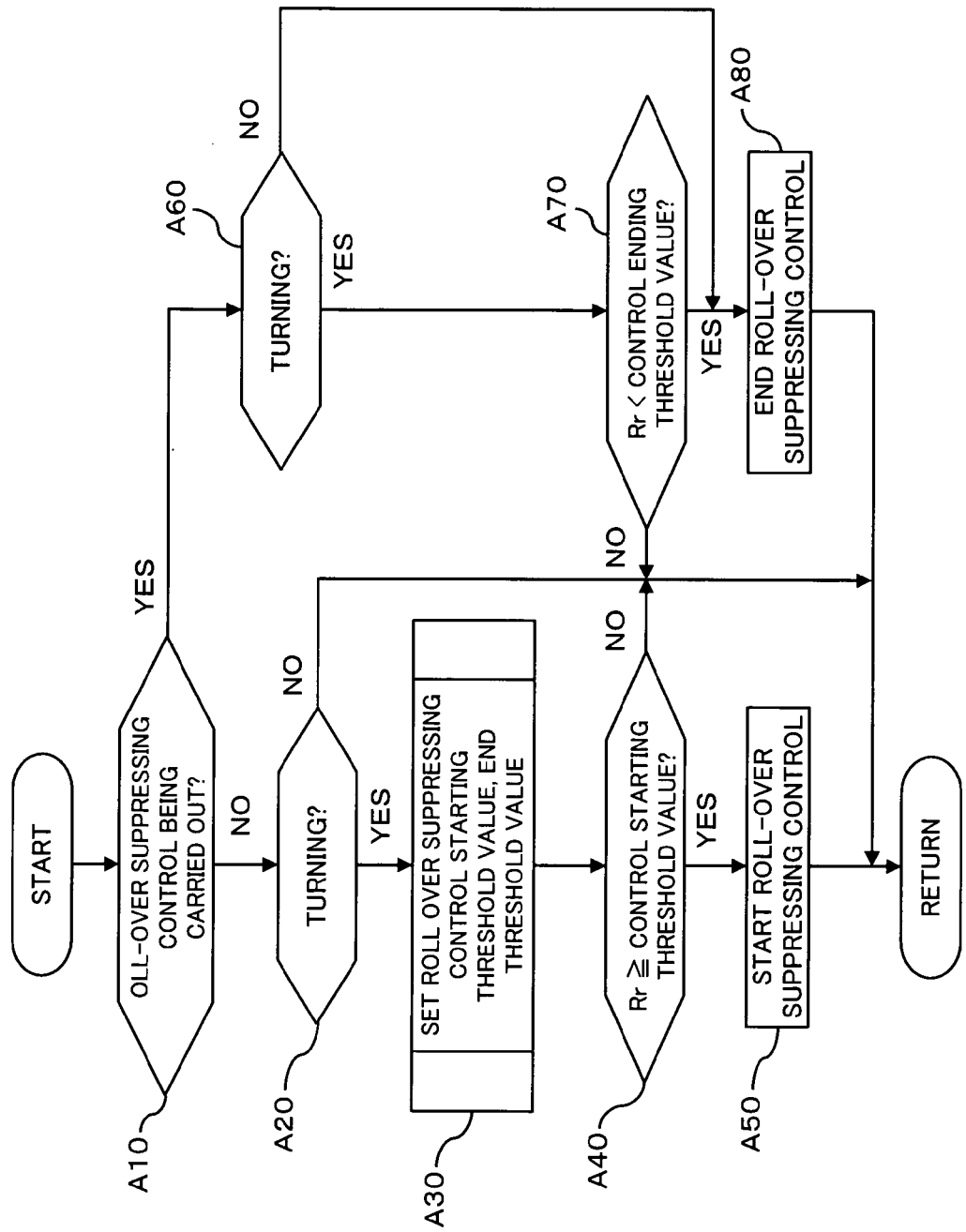
Figure 7:
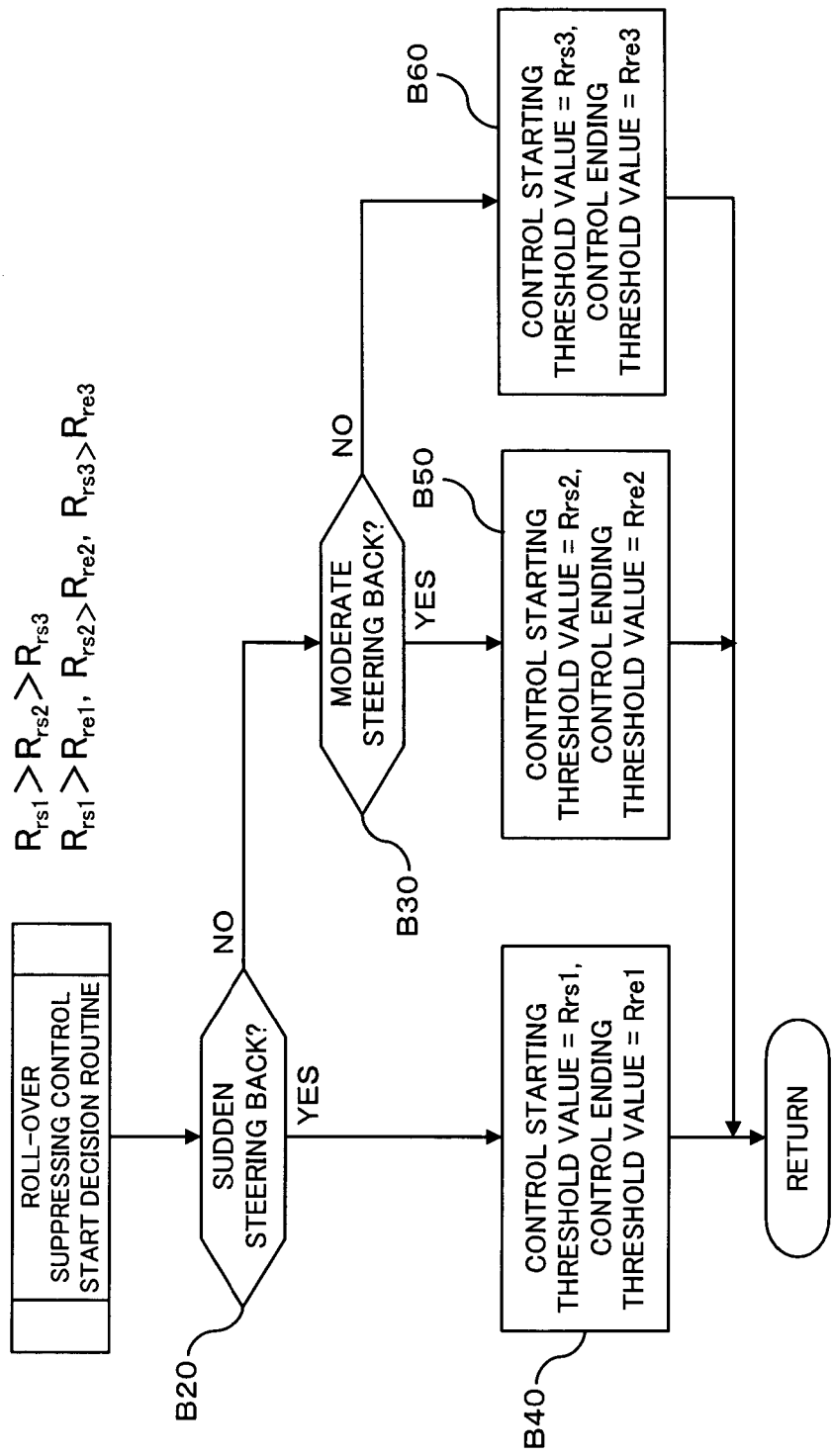

Since the roll-over suppressing control apparatus for a vehicle according to the embodiment of the present invention is configured in such a manner as described above, it carries out its control, for example, in such a manner as illustrated in FIGS. 6 and 7.

Referring first to FIG. 6, it is determined whether or not roll-over suppressing control is being carried out (step A10). If roll-over suppressing control is not being carried out, then it is determined whether or not the vehicle is turning (step A20). If the vehicle is not turning, then the processing in this operation cycle is ended. However, if the vehicle is turning, then the control start/end threshold value setting section 35a sets a control starting threshold value $R_{rs}$ and a control ending threshold value $R_{re}$ in response to the type of turning of the vehicle (step A30).

In particular, as seen in FIG. 7, whether or not sudden steering back has been performed is determined depending upon whether or not the steering wheel angular velocity $\omega_h$ in the steering back direction is equal to or higher than the comparatively high threshold value $\omega_{h1}$ (step B20). Here, if it is determined that sudden steering back has been performed, then the threshold value $R_{rs}$ and the threshold value $R_{re}$ for the roll rate $R_r$ are set to comparatively high values $R_{rs1}$ and $R_{re1}$ (where $R_{rs1} > R_{re1}$), respectively (step B40).

If it is determined at step B20 that sudden steering back turning has not been performed, then whether or not some other steering back turning (that is, comparatively moderate steering back turning) has been performed is determined depending upon whether or not the steering wheel angular velocity $\omega_h$ in the steering back direction is equal to or higher than the comparatively low threshold value $\omega_{h2}$ (step B30) If it is determined here that such steering back turning has been performed, then the control starting threshold value $R_{rs}$ and the control ending threshold value $R_{re}$ for the roll rate $R_r$ are set to the medium values $R_{rs2}$ and $R_{re2}$ (where $R_{rs2} > R_{re2}$), respectively (step B50).

If it is determined at step B30 that such steering back turning has not been performed, then it is determined that the turning is one-directional turning, and the control starting threshold value $R_{rs}$ and the control ending threshold value $R_{re}$ for the roll rate $R_r$ are set to the comparatively low values $R_{rs3}$ and $R_{re3}$ (where $R_{rs3} > R_{re3}$), respectively (step B60).

After the control starting threshold value $R_{rs}$ and the control ending threshold value $R_{re}$ are set in response to the type of turning of the vehicle in this manner, the control decision section 35 determines, on the assumption that the vehicle is turning, whether or not the roll rate $R_r$ is equal to or higher than the threshold value $R_{rs}$ set in advance (step A40). Then, if the roll rate $R_r$ is equal to or higher than the threshold value $R_{rs}$, then roll-over suppressing control is carried out (step A50).

In the roll-over suppressing control, during turning of the vehicle in a leftward direction as seen in FIG. 3(a), braking force is applied to the right front wheel 5FR and the right rear wheel 5RR which are turning outer wheels. On the other hand, during turning of the vehicle in a rightward direction as seen in FIG. 3(b), braking force is applied to the left front wheel 5FL and the left rear wheel 5RL. In both cases, the braking force is applied with the magnitude corresponding to the roll rate $R_r$.

In particular, upon turning of the vehicle in the leftward direction, braking force applied to the right front wheel 5FR and the right rear wheel 5RR causes the vehicle to generate a yaw moment in the clockwise direction as seen in FIG. 3(a). This yaw moment in the clockwise direction acts to increase the turning radius of the vehicle in the leftward direction (that is, the yaw moment provides an under steer tendency to the steering characteristic of the vehicle so that the traveling route may be swollen to the turning outer side) thereby to suppress the rolling angle in the rightward rollover direction generated on the vehicle. Further, upon turning of the vehicle in the leftward direction, the load of ground contact of the left front wheel 5FL and the left rear wheel 5RL which are turning inner wheels decreases, and particularly in a situation wherein roll-over suppressing control is required, the tyres do not sometimes contact with the ground. Meanwhile, since the load of ground contact of the right front wheel 5FR and the right rear wheel 5RR which are turning outer wheels has an increasing tendency, by applying braking force to the right front wheel 5FR and the right rear wheel 5RR, the vehicle speed $V_b$ can be slowed down effectively, and rolling of the vehicle in the rightward roll-over direction can be suppressed effectively.

Similarly, upon turning of the vehicle in the rightward direction, braking force applied to the left front wheel 5FL and the left rear wheel 5RL causes the vehicle to generate a yaw moment in the counterclockwise direction as seen in FIG. 3(b). This yaw moment in the counterclockwise direction acts to increase the turning radius of the vehicle in the rightward direction (that is, the yaw moment provides an under steer tendency to the steering characteristic of the vehicle so that the traveling route may be swollen to the turning outer side) thereby to suppress the rolling angle in the leftward roll-over direction generated on the vehicle. Thus, by applying braking force to the left front wheel 5FL and the left rear wheel 5RL which are turning outer wheels, the vehicle body speed $V_b$ can be slowed down effectively, and rolling of the vehicle in the leftward roll-over direction can be suppressed effectively.

Further, as seen in FIG. 6, while the roll-over suppressing control is being carried out, it is determined whether or not the vehicle is turning (step A60). If the vehicle is not turning, then the roll-over suppressing control is ended (step A80), but if the vehicle is turning, then the control decision section 35 determines whether or not the roll rate $R_r$ is lower than the threshold value $R_{re}$ set at step A30 (step A70). Then, if the roll rate $R_r$ is lower than the threshold value $R_{re}$, then the roll-over suppressing control is ended (step A80).

In this manner, in the present apparatus, the control starting threshold value with which it is determined whether or not the vehicle is in an excessive rolling state to determine whether or not roll-over suppressing control wherein braking force is applied to the turning outer wheels should be started is set to a value which differs depending upon the type of turning of the vehicle. Consequently, the roll-over suppressing control can be started appropriately in response to the type of turning of the vehicle.

In particular, since it is considered that, in the case of steering back turning, turning over of the vehicle on its side does not occur unless the roll rate becomes higher to some degree than that upon one-directional turning, by setting the control starting threshold values $R_{rs1}$, $R_{rs2}$ for steering back turning to higher values than that of the control starting threshold value $R_{rs3}$ for one-directional turning, the roll-over suppressing control is prevented from being started unnecessarily upon steering back turning. Consequently, while the traveling performance of the vehicle is assured to the utmost, roll-over can be suppressed.

In particular, since the roll-over suppressing control is performed by applying braking force to the wheels, it degrades the traveling performance of the vehicle, and therefore, it is desirable not to perform the roll-over suppressing control when it is not necessitated, but it is desired to perform the roll-over suppressing control when it is required. Where such logic that roll-over suppressing control is started upon turning of the vehicle when a parameter value (here, the roll rate) becomes equal to or higher than a control starting threshold value set in advance is adopted, if the control starting threshold value is set to a suitable value for each of the types of turning of the vehicle as in the present embodiment, then roll-over can be suppressed while the traveling performance of the vehicle is assured to the utmost.

While an embodiment of the present invention is described above, the present invention is not limited to the embodiment specifically described above, and variations and modifications can be made without departing from the scope of the present invention.

For example, the flow of FIG. 7 may be replaced by a flow of FIG. 8. In particular, referring to FIG. 8, it is first determined which one of one-directional turning and steering back turning the type of turning of the vehicle is (step B10). If the turning is steering back turning, then it is determined whether or not the steering back turning is sudden turning (step B20), and required threshold values are set based on a result of the determination.

Further, the classification of types of turning of a vehicle is not limited to that in the embodiment described above, and also the parameter value to be used for determination of a start and an end of roll-over suppressing control is not limited to the roll rate only if it corresponds to a rolling state of the vehicle.

In particular, where roll-over suppressing control is started when a parameter value corresponding to a rolling state of a vehicle becomes equal to or higher than a control starting threshold value set in advance, when the relationship between the parameter value and the degree of the possibility of roll-over of the vehicle differs depending upon the type of turning of the vehicle, different control starting threshold values are set for the different types of turning of the vehicle. By this, while the traveling performance of the vehicle is assured to the utmost, roll-over can be suppressed. Naturally, turning of the vehicle may otherwise be classified into two types of one-directional turning and steering back turning.

What is claimed is:

1. A roll-over suppressing control apparatus for a vehicle, comprising:
    a braking mechanism for braking wheels of said vehicle;
    parameter value detection means for detecting a value of a parameter corresponding to a rolling state of said vehicle; and
    roll-over suppressing control means for controlling said braking mechanism,
    wherein if the parameter value detected by said parameter value detection means upon turning of said vehicle becomes equal to or higher than a control starting threshold value, then said roll-over supressing control means determines that said vehicle is in an excessively rolling state and controls said braking mechanism to apply a braking force to said wheels,
    wherein the control starting threshold value is set to different values depending upon whether a steering wheel of said vehicle is rotated in one direction or multiple directions.

2. The roll-over suppressing control apparatus for a vehicle as claimed in claim 1, wherein the parameter value is a roll rate of said vehicle, and said parameter value detection means is roll rate detection means for detecting the roll rate.

3. The roll-over suppressing control apparatus for a vehicle as claimed in claim 1, wherein a condition that said vehicle is turning is set to satisfaction of all of conditions that a vehicle speed is higher than a predetermined vehicle speed set in advance, that the steering angular velocity is equal to or higher than a predetermined angular velocity set in advance, and that a lateral acceleration of said vehicle is equal to or higher than a predetermined acceleration set in advance.

4. A roll-over suppressing control apparatus for a vehicle, comprising:
- a braking mechanism for braking wheels of said vehicle;
- parameter value detection means for detecting a value of parameter corresponding to a rolling state of said vehicle; and
- roll-over suppressing control means for controlling said braking mechanism,
- wherein if the parameter value detected by said parameter value detection means upon turning of said vehicle becomes equal to or higher than a control starting threshold value, then said roll-over suppressing control means determines that said vehicle is in an excessively rolling state and controls said braking mechanism to apply a braking force to said wheels,
- wherein the control starting threshold value is set to different values depending upon different types of turning of said vehicle, and
- wherein the types of turning of said vehicle include one-directional turning where said vehicle turns only in one direction and steering back turning where the turning direction is changed over halfway.

5. The roll-over suppressing control apparatus for a vehicle as claimed in claim 4, wherein the parameter value is a roll rate of said vehicle, and said parameter value detection means is roll rate detection means for detecting the roll rate.

6. The vehicle roll-over suppressIng control of apparatus as claimed in claim 5, wherein if the roll rate detected by said roll rate detection means upon turning said vehicle is lower than a control ending threshold value set in advance as a value lower than the control starting threshold value, then said roll-over suppressing control means ends the control for applying the braking force to said wheels.

7. The roll-over suppressing control apparatus for a vehicle as claimed in claim 4, wherein the control starting threshold value upon the steering back turning is set to a value higher than the control starting threshold value upon the one-directional turning.

8. The roll-over suppressing control apparatus for a vehicle as claimed in claim 7, wherein the steering back turning includes quick steering back turning where the steering back turning is performed quickly and normal steering back turning where the steering back turning is performed at a normal speed or less, and the control starting threshold value upon the quick steering back turning is set to a value higher than the control starting threshold value upon the normal steering back turning.

9. The roll-over suppressing control apparatus for a vehicle as claimed in claim 8, wherein discrimination between the quick steering back turning and the normal steering back turning is performed by comparing a magnitude of a steering angular velocity upon the steering back turning with a reference value set in advance, and if the magnitude of the steering angular velocity is equal to or higher than the reference value, then said roll-over supressing control means determines that the turning is the quick steering back turning, but if the magnitude of the steering angular velocity is lower than the reference value, then said roll-over supressing control means determines that the turning is the normal steering back turning.

10. A roll-over suppressing control apparatus for a vehicle, comprising:
- a braking mechanism for braking wheels of said vehicle;
- a rolling state sensor for detecting a value of parameter corresponding to a rolling state of said vehicle; and
- a braking controller for controlling said braking mechanism,
- wherein if the parameter value detected by said rolling state sensor upon turning of said vehicle becomes equal to or higher than a control starting threshold value, then said braking controller determines that said vehicle is in an excessively rolling state and controls said braking mechanism to apply a braking force to the wheels,
- wherein the control starting threshold value is set to different values depending upon whether a steering wheel of said vehicle is rotated in one direction or multiple directions.

11. The roll-over suppressing control apparatus for a vehicle as claimed in claim 10, wherein said rolling state sensor is a roll rate sensor for detecting a roll rate of said vehicle as the parameter value, and if the roll rate detected by said roll rate sensor upon turning said vehicle is lower than a control ending threshold value set in advance as a value lower than the control starting threshold value, then said braking controller ends the control for applying the braking force to said wheels.

* * * * *